Patented Nov. 10, 1931

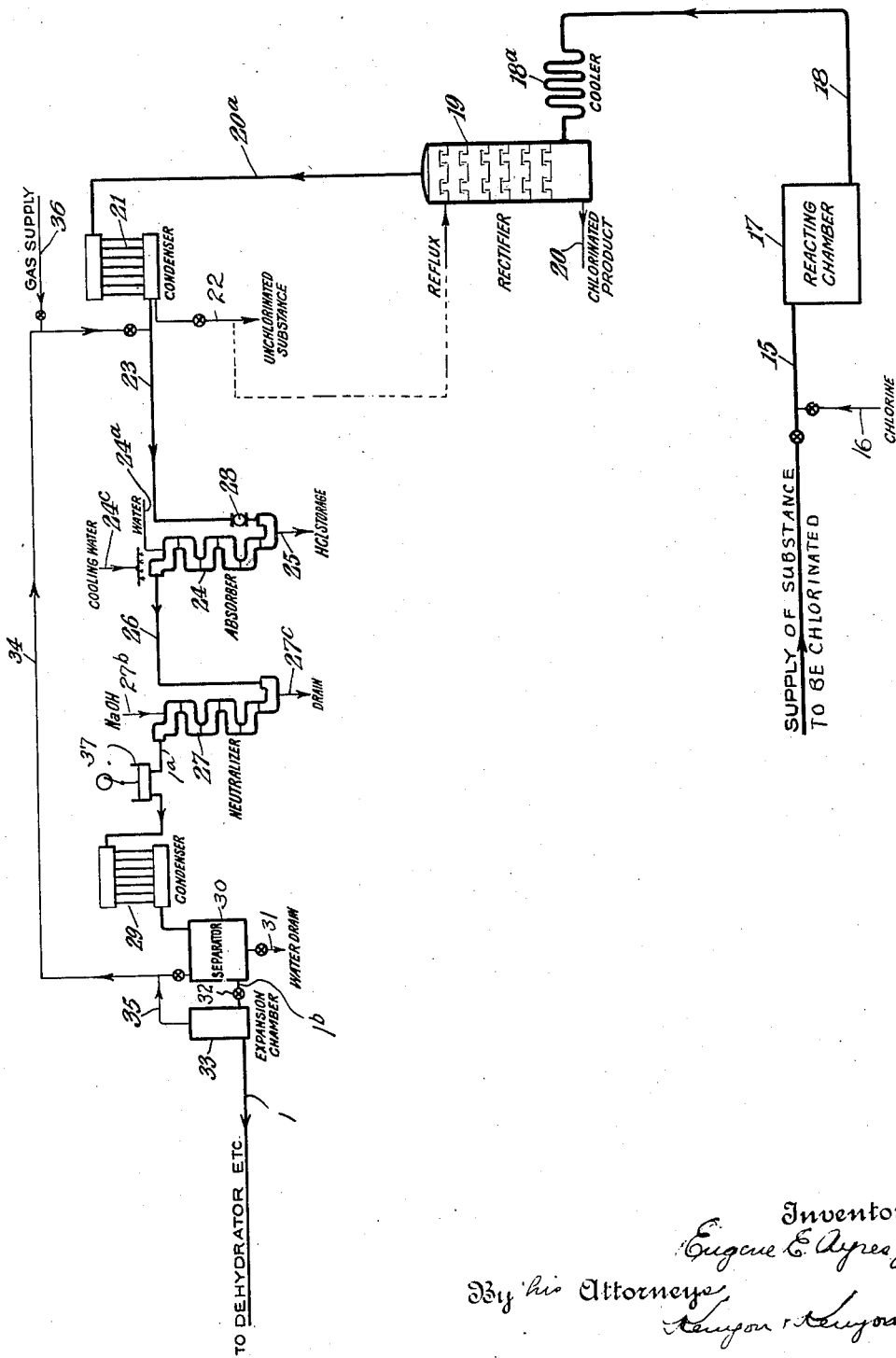

1,831,474

UNITED STATES PATENT OFFICE

EUGENE E. AYRES, JR., OF SWARTHMORE, PENNSYLVANIA, ASSIGNOR TO THE B. A. S. COMPANY, OF PHILADELPHIA, PENNSYLVANIA, A CORPORATION OF DELAWARE

CHLORINATION

Application filed February 4, 1927. Serial No. 165,875.

My invention relates to chlorination wherein hydrogen chloride is produced and to the recovery of hydrogen chloride from a mixture therewith of a substance capable of forming a film on water.

In chlorination by substitution, the products passing from the chlorinating step include hydrogen chloride, the chlorinated substance, and substances that are passed again through the chlorinating step and which consist chiefly of that fraction of the original substance to be chlorinated which was not chlorinated in its passage through the chlorinating step. If chlorinated substances are returned to the chlorinating step they are very likely to be chlorinated to an undesirably high degree, and it is, therefore, desirable to remove chlorinated substances from the products of chlorination at some time before unchlorinated substances in those products are returned to the chlorination step. It is desirable to redistill the chlorinated substance withdrawn from the products of chlorination. For example, when pentanes are chlorinated amyl chlorides withdrawn from the products of chlorination, even by rectification, contain pentanes and higher boiling chlorides. But, the chlorinated substances should be dry when redistilled, to avoid formation of hydrochloric acid as a result of the decomposition of chlorides incidental to the redistillation. It is desirable, therefore, to withdraw chlorinated substances from the products of chlorination prior to removal of hydrogen chloride therefrom by water absorption with consequent moistening of all other substances present. Introduction of moisture into the chlorination must be avoided, and it is desirable, therefore, that substances that are to be returned to the chlorinating step be withdrawn, so far as practicably possible, from the products of chlorination prior to water-absorption therefrom of hydrogen chloride, and preferably after removal of chlorinated products by rectification.

A further development of my invention resides in so preparing products of chlorination for return to the chlorinating step, including the removal therefrom of hydrogen chloride, that the requirements set out are met and the difficulties avoided.

If it is attempted to absorb hydrogen chloride from a mixture of gases and vapors that contains a substance immiscible with water, such immiscible substance, if it is in liquid form or condenses during the absorption operation, will form a film over the water surface and prevent absorption of the hydrogen chloride.

I have discovered that hydrogen chloride may be effectively absorbed from a mixture of gases containing a substance that will form such a film on the water, provided that the absorption is carried out under conditions that maintain such a film-forming substance in vapor phase throughout the absorption operation.

In the absorption of hydrogen chloride by water from the products of a chlorinating reaction, the lower the temperature at which the absorption is carried out the more concentrated will be the resulting aqueous hydrochloric acid, other conditions, including the amount of water used and the degree to which hydrogen chloride is removed, being unchanged. And, in the commercial absorption of hydrogen chloride from such products, it is desirable to carry out the absorption under such conditions that the use of an amount of water which will result in the production of 22° Baumé acid or higher will effect substantially complete removal of hydrogen chloride.

Accordingly, a feature of my invention consists of absorbing hydrogen chloride with water from a mixture containing a film-forming substance, while maintaining the temperature at which absorption takes place, within a range in which the film-forming substance is in vapor form and aqueous hydrochloric acid of desired concentration will be produced. One method of so regulating the temperature at which absorption takes place consists in regulating the flow of cooling water for the absorbing apparatus.

However, some mixtures containing hydrogen chloride, contain a film-forming substance that can be kept in vapor form by mere control of temperature, only at temperatures so high that the use of a quantity of absorbing water that will produce hydrochloric acid of desired strength, will not sufficiently remove hydrogen chloride from the mixture, and the use of enough water at such temperatures, to sufficiently remove the hydrogen chloride will produce hydrochloric acid of undesirable low concentration. It is a feature of my invention, under such circumstances, to add to the mixture containing hydrogen chloride and the film-forming substances a sufficient quantity of gas of high vapor pressure to make it possible to carry out the absorption of hydrogen chloride at such temperatures that the hydrogen chloride will be sufficiently eliminated from the mixture when hydrochloric acid of desired strength is produced. By carrying out the absorption operation at or near the highest temperature at which hydrogen chloride elimination and production of suitably concentrated hydrochloric acid may be effected, the quantity of additional gas of high vapor pressure is kept at a minimum.

On the other hand, when substances of high vapor pressure are so added the temperature at which absorption is carried out can be reduced to points below the maximum temperature at which complete removal of hydrogen chloride and production of acid of desired concentration will occur, provided the proportion of the added substances is increased beyond the minimum. In some cases both temperature regulation and addition of high vapor-pressure gas may be necessary to prevent film formation, while in other cases it may be more convenient to prevent film formation by adding high vapor pressure substances than by regulating temperature of absorption, an example of the latter operation being the case where large quantities of low temperature cooling water are available and the film forming substances are pentanes.

In the practice of my invention the temperature at which absorption is carried out can be regulated by controlling the temperature and rate of flow of cooling water that takes heat from the apparatus in which absorption is effected; and substances of high vapor pressure added to prevent film formation can be separated from the vapors passing from the absorption operation by condensing the substances in those vapors, as by compression or cooling or both, without condensing the added substances. The uncondensed added substances may then be passed to the vapors entering the absorption operation. The condensed substances may be returned to the chlorinating reaction.

In the practice of my invention air or any fixed gas that is chemically inactive under the existing conditions or low boiling hydrocarbons may be used as the added substance of high vapor pressure; and the substances chlorinated may be aliphatic hydrocarbons or other substances that can be chlorinated by substitution and which are insoluble in water.

When the lowest boiling substances in the chlorination products from which chlorinated substances have been removed are pentanes, it is possible to keep them in vapor form during absorption by careful regulation of the absorption temperature and still produce aqueous hydrochloric acid of desired concentration while sufficiently freeing the pentanes of hydrogen chloride; and my process is entirely successful in connection with the chlorination of pentanes and has contributed extensively to my commercial practice thereof. If hexane is present some higher-vapor-pressure substance such as butane must be added in an amount that will maintain the hexane in vapor phase in the absorber at the temperature adopted to ensure complete absorption and sufficiently concentrated acid.

To assist in the understanding of my invention, I have shown diagrammatically in the single figure of the annexed drawing, apparatus whereby my invention may be practiced in connection with products of a chlorination reaction, it being understood, however, that my invention is not limited to that application thereof, and that variations may be made, within the spirit of my invention, in the apparatus shown, for the purpose of treating the same or other mixture.

In the apparatus diagrammatically shown in the drawing hydrocarbon vapor is passed through pipe 15 and mixed with chlorine vapor introduced through pipe 16 and the mixture of gases enters reacting chamber 17 in which the reaction is produced in any desired manner as by heat or light. Products of the chlorinating reaction pass through pipe 18 and cooler 18a to the lower part of the rectifying column 19. Chlorides produced and some unchlorinated hydrocarbons are withdrawn through pipe 20 from the rectifying column. Vapors from the rectifying column pass through pipe 20a to condenser 21 from which condensed unchlorinated hydrocarbons pass out through pipe 22 and may be passed again to the chlorinating reaction and a part of the condensed hydrocarbon may be used as a refluxing liquid in column 19. Hydrogen-chloride-containing vapors pass from cooler 21 through pipe 23 to the lower part of the hydrochloric acid absorbing device 24 which may, as indicated, consist of a sinuous passage constructed of acid resisting material such as silica-ware. Water is introduced by pipe 24a into the upper part of absorption device 24. Aqueous hydrochloric acid is withdrawn from the lower part through pipe 25 and the remaining vapors, containing unchlorinated hydrocarbons, pass from the upper part of absorption device 24 through pipe 26. The temperature at which absorption takes place may be controlled by the use of cooling water, discharging over the absorption device 24 from pipe 24c. For the further protection of the chlorinating equipment the vapors passing through pipe 26 may be neutralized as by being passed into the lower part of neutralizing chamber 27 into the top of which a caustic soda solution is introduced by pipe 27b, residual caustic soda solution being withdrawn by pipe 27c from neutralizer 27. Neutralized vapor may be passed by pipe 1a to compressor 37 and then to a cooler 29 from which they are led into separator 30. From the bottom of separator 30 water is withdrawn by pipe 31 and from a point above the bottom of the separator a pipe 1b, containing relief valve 32, conducts condensed hydrocarbons to a pressure release chamber 33. From chamber 33 hydrocarbons are conducted through pipe 1 and may be returned to the chlorinating reaction, preferably after being dehydrated.

When the vapors passing through pipe 23 to the absorption device contain a film-forming substance that can not be maintained in vapor phase within the absorber at a temperature sufficiently low to ensure that the vapors may be sufficiently freed of hydrogen chloride in the absorber and to ensure that hydrochloric acid of desired strength will be produced, a gas of high vapor pressure may be led into pipe 23 by pipe 36. The compressing and condensing operations are so conducted that such added gas is not condensed and it is withdrawn from separator 30 by pipe 34 which returns it to pipe 23. If any of the added gas of high vapor pressure is released when the hydrocarbons pass from separator 30 to chamber 33, that gas is conducted from the chamber 33 by pipe 35 and introduced into pipe 34. Any desired apparatus may be used for effectively removing such added gas from the acid-freed substance.

It is apparent from the foregoing that the apparatus diagrammatically shown has provision for controlling the temperature of the absorber and provision for maintaining gas of high vapor pressure in the absorber and recirculating it thereto.

While I have described my invention and apparatus for use in the practice thereof, in great detail, my invention is not limited to such details but includes such variations and modifications as fall within the hereunto appended claims. In this connection it is pointed out that if some or all of the unchlorinated hydrocarbon, or some or all of the chlorinated substance, or some or all of both, is passed into the absorber, the conditions therein may be so controlled, as by regulation of temperature or introduction of gas of high vapor pressure, or in both ways, that such hydrocarbon and chloride will remain in vapor phase during the absorption of the hydrogen chloride; and suitable pressure and temperature conditions may be maintained by the use of heating and cooling devices and valves and pressure equalizing devices at suitable points including the valve 28 for reducing the pressure of vapors entering the absorber.

Still referring to the chlorination of pentanes as an exemplary application of my invention, I have carried out the chlorination thereof as follows:

Vapor of pentanes formed at 85° C. to 100° C. and at about 75 pounds gauge pressure and chlorine vapor at 40° C. to 60° C. and at a pressure above 60 pounds, have been brought together in the proportion of 15 to 20 parts pentane to one part chlorine (by weight), at about 85° C. to 100° C. under a pressure of 35 to 50 pounds and caused to react by heating to a temperature between 275° C. and 325° C. Then the products of chlorination were cooled to about 80° C. to 85° C. under a pressure of 15 to 25 pounds and introduced into a rectifier from which a mixture of amyl chlorides and pentanes was withdrawn in liquid form while a reflux of pentanes at atmospheric temperature was maintained. The vapors leaving the rectifier were at the boiling point of pentane at the pressure used and were condensed under a pressure that would cause the pentanes to liquefy at the temperature of cooling water available, for example, 10 pounds. Hydrogen chloride was absorbed by water under substantially atmospheric pressure and at a temperature approximating 37° C. to 43° C., the absorption of hydrogen chloride being substantially complete under those conditions and the aqueous hydrochloric acid having a concentration of 22° Bé. or higher, condensation and dehydration of acid-freed vapors of pentanes passing from the absorption step being conveniently carried out under about 10 pounds of pressure.

What I claim and desire to secure by Letters Patent is:

1. In the absorption of hydrogen chloride with water from a mixture containing a substance that would otherwise form a film on water and which may be maintained in vapor form under conditions permitting absorption of hydrogen chloride by water, the process comprising contacting the mixture with water while maintaining the temperature of contacting high enough to maintain the substance in vapor phase at the existing pressure and maintaining the substances under temperature and pressure conditions that permit effective absorption of hydrogen chloride in water.

2. In the absorption of hydrogen chloride with water from a mixture containing a substance that would otherwise form a film on water and which may be maintained in vapor form under conditions permitting absorption of hydrogen chloride by water, the process comprising contacting the mixture with water while maintaining the temperature of contacting high enough to maintain the substance in vapor phase, and low enough to permit absorption of hydrogen chloride by water to a commercial concentration.

3. A process for absorbing hydrogen chloride with water in the presence of pentane which comprises contacting the hydrogen chloride with water while maintaining the pentane in vapor phase and maintaining the substances under temperature and pressure conditions that permit effective absorption of hydrogen chloride in water.

4. A process for absorbing hydrogen chloride with water in the presence of pentane which comprises contacting the hydrogen chloride with water while maintaining the pentane in vapor phase and maintaining the temperature of contacting sufficiently low to produce hydrochloric acid of not less than 22° Baumé.

5. A process for absorbing hydrogen chloride with water in the presence of pentane which comprises contacting the hydrogen chloride with water while maintaining the temperature above but not substantially higher than the boiling point of pentane at the pressure at which contact is made.

6. In the absorption of hydrogen chloride with water from a mixture containing a substance that would otherwise form a film on water and which may be maintained in vapor form under conditions permitting absorption of hydrogen chloride by water, the process comprising contacting the mixture with water while maintaining the vapor pressure of the substance sufficiently high to maintain the substance in vapor phase and maintaining temperature and pressure conditions suitable to effective absorption of hydrogen chloride in water.

7. In the absorption of hydrogen chloride with water from a mixture containing a substance that would otherwise form a film on water and which may be maintained in vapor form under conditions permitting absorption of hydrogen chloride by water, the process comprising contacting the mixture with water at a temperature suitable to effective absorption of hydrogen chloride in water while maintaining the vapor pressure of the substances present in addition to hydrogen chloride sufficiently high to prevent condensation of such substances at the temperature at which contact is made.

8. In the absorption of hydrogen chloride with water from a mixture containing a substance that would otherwise form a film on water and which may be maintained in vapor form under conditions permitting absorption of hydrogen chloride by water, the process comprising contacting the mixture with water while maintaining the vapor pressure of the substances present in addition to hydrogen chloride sufficiently high to prevent condensation of such substances at the temperature at which contact is made while maintaining the temperature of contacting sufficiently low to permit absorption to a commercial concentration.

9. A method of absorbing hydrogen chloride in water in the presence of a substantially water immiscible substance which may be maintained in vapor form under conditions permitting absorption of hydrogen chloride by water which comprises contacting water with the hydrogen chloride in the presence of a water-immiscible substance having a lower boiling point than the first mentioned substance at a temperature that maintains the first mentioned substance in vapor phase and is low enough to permit effective removal of hydrogen chloride.

10. A method of absorbing hydrogen chloride in water in the presence of a substantially water immiscible substance which may be maintained in vapor form under conditions permitting absorption of hydrogen chloride by water which comprises adding to the mixture a second water-immiscible substance of higher vapor pressure than the substantially water immiscible substance and then contacting the mixture with water while the first mentioned water immiscible substance is in vapor phase under conditions that permit effective removal of hydrogen chloride.

11. In the chlorination of pentane the process for the removal of hydrogen chloride from products of chlorination which comprises contacting with water the products of chlorination at a temperature high enough to maintain the pentane in vapor phase and low enough to permit absorption by the water of hydrogen chloride to a commercial concentration.

12. A process for the separation of substances one of which is soluble in water and one of which is substantially immiscible with water and capable of being in vapor or liquid phase at temperatures at which the water-soluble substance may be absorbed in water which comprises absorbing the more soluble substance in water while maintaining both substances in vapor phase by adjusting the relation between the temperature and pressure of the vapor mixture within ranges that permit effective removal of the water-soluble substance in water.

13. In the absorption of hydrogen chloride with water from a mixture containing a substance that would otherwise form a film on water and which may be maintained in vapor form under conditions permitting absorption of hydrogen chloride by water, the process comprising contacting the mixture with water while maintaining such temperature and pressure at the point of contacting that the substance will be in vapor phase and hydrogen chloride will be sufficiently absorbed in the water to produce aqueous hydrochloric acid of commercial strength.

14. In the chlorination of hydrocarbons immiscible with water and which would otherwise be in liquid phase in the water-absorption of hydrogen chloride therefrom, the steps comprising removing chlorinated substances by rectification from the products of chlorination, contacting remaining products with water under conditions of temperature and pressure and vapor tension of the substances present that maintain the hydrocarbon in vapor phase and permit effective removal of the hydrogen chloride, and passing the acid-freed hydrocarbon back to the chlorinating operation.

15. In the chlorination of pentanes, the steps comprising removing chlorinated pentanes by rectification from the products of chlorination, contacting remaining products including hydrogen chloride with water while maintaining the pentanes in vapor form at a temperature permitting substantially complete removal of hydrogen chloride and production of aqueous hydrochloric acid of commercial strength, and returning pentanes substantially freed of acid and of chlorides of pentanes to the chlorinating step.

16. In the absorption of hydrogen chloride with water from a mixture containing a substance that would otherwise form a film on the water and which may be maintained in vapor form under conditions permitting absorption of hydrogen chloride by water, the process comprising contacting the mixture with water while maintaining conditions of temperature and pressure and vapor tension of the substances present that preserve said film-forming substance in vapor phase and permit effective absorption of hydrogen chloride by water.

In testimony whereof, I have signed my name to this specification.

EUGENE E. AYRES, Jr.